United States Patent [19]

Redford

[11] 4,079,986

[45] Mar. 21, 1978

[54] MOUNTING ARRANGEMENT FOR VEHICLE CABS

[76] Inventor: John Redford, 7 E. 37th St., Kansas City, Mo. 64111

[21] Appl. No.: 759,893

[22] Filed: Jan. 17, 1977

[51] Int. Cl.² .............................................. B62D 23/00
[52] U.S. Cl. ............................... 296/28 C; 296/35 A; 180/89.13
[58] Field of Search ................ 296/28 C, 35 R, 35 A; 180/89 A; 105/366 B

[56] References Cited

U.S. PATENT DOCUMENTS

| | | | |
|---|---|---|---|
| 3,940,177 | 2/1976 | Miers | 296/35 R |
| 3,989,294 | 11/1976 | Carr | 296/35 A |

*Primary Examiner*—Philip Goodman
*Attorney, Agent, or Firm*—Fishburn, Gold & Litman

[57] ABSTRACT

A mounting arrangement for nonrigidly connecting a vehicle cab enclosure with a vehicle body, comprises a rigid, elongate plate fixedly attached to the base of the enclosure and extending around a marginal surface of the vehicle body. A plurality of pins are attached to and depend perpendicularly from the plate in a spaced apart and generally aligned relationship, and are telescopically inserted into mating apertures positioned in the vehicle body for sliding cooperation therewith. A flexible and resilient gasket is positioned between the plate and the vehicle body marginal surface and receives the pins through associated apertures positioned therein whereby the gasket resists the transmission of vibratory motion between the vehicle enclosure and body. A plurality of longitudinally resilient fasteners are spaced apart along the body marginal surface and have one end thereof connected with a sidewall portion of the vehicle enclosure and the other end connected with the vehicle body. A resilient member urges the ends of the fastener convergingly together, thereby pulling the plate toward the vehicle body marginal surface and securely, yet yieldingly connecting the cab enclosure with the vehicle body.

10 Claims, 3 Drawing Figures

MOUNTING ARRANGEMENT FOR VEHICLE CABS

This invention relates to a tie-down device for mating vehicle parts and in particular, to a mounting arrangement for non-rigidly connecting a cab enclosure and vehicle body.

Removable enclosures for open vehicles, such as sport cars, boats, snowmobiles, golf carts and the like, are quite common in the recreational vehicle field. In particular, heavy duty, off-the-road automobiles, such as those manufactured under the trademark "Jeep" are presently being used both as a recreational vehicle, for hunting, hill climbing, and the like, and as a town car for every day transportation. Such vehicles are typically constructed with an open body, to which an optional cab structure is separably attachable. The cab enclosure is attached to the vehicle to protect the driver during high speed, expressway use, as well as during inclement weather conditions, and is removable therefrom for recreational use during more pleasant and temperate weather conditions.

Although some cab enclosures are constructed of metal, canvass, or the like, those constructed of resinous material such as fiberglass, have become quite popular due to their lightweight for facilitating removal, anticorosion characteristics for durability, and rigidity for improved sealing with the body. The structures are generally formed of a single thickness of synthetic material having a bottom edge rigidly connected with the metal body of the vehicle. Due to the vibratory motion and jars transmitted to the cab enclosures from the body during vehicle use over rough roads, as well as the brittle nature of the resinous material, the cab base often cracks and breaks at the points of connection with the vehicle, thereby ruining the enclosure and creating a safety hazard.

The principal objects of the present invention are: to provide a mounting arrangement for securely and yieldingly connecting a vehicle cab enclosure with a vehicle body; to provide such an arrangement wherein the cab enclosure is constructed of a lightweight, rigid, moldable material such as a polymeric resin, fiberglass, or the like; to provide such an arrangement wherein the vehicle cab enclosure is easily bodily removable from the vehicle body; to provide such an arrangement wherein the vehicle cab enclosure includes a double walled structure for light weight, improved strength, and secured attachment to the body; to provide such an arrangement having a rigid elongate plate connected with the enclosure and having a plurality of pins depending therefrom and mating with transverse apertures through the vehicle body for locating and horizontally retaining the cab and body members; to provide such an arrangement wherein a flexible and resilient gasket is disposed between the plate and the vehicle body and resists the transmission of vibratory motion therebetween for non-destructive, long lasting cab attachment; to provide such an arrangement wherein resilient fastening means urges the cab base and the vehicle body together for a secure, yet yielding connection therebetween; to provide such an arrangement wherein a plurality of anti-friction sleeves are positioned in each of the vehicle body apertures and slidingly cooperate with the pins for non-abrading contact therebetween; and to provide such an arrangement which is economical to manufacture, efficient in use, capable of long operating life, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include exemplary embodiments of the present invention and illustrate various objects and features thereof.

Figure 1:
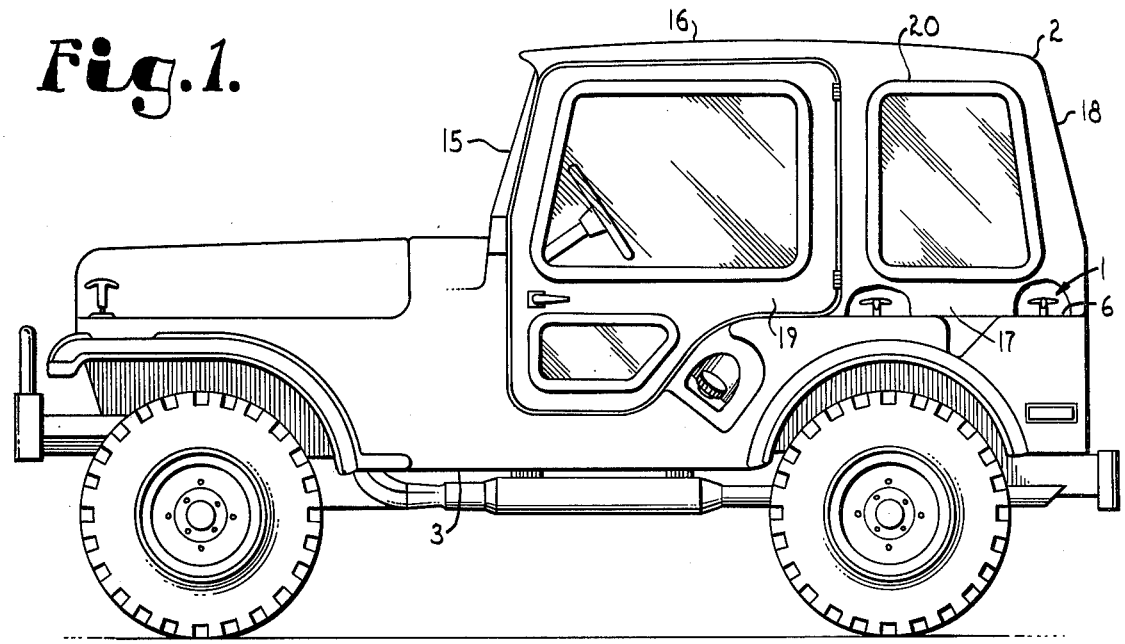
FIG. 1 is a side elevational view of a mounting arrangement embodying the present invention, shown connecting a vehicle cab enclosure to a vehicle body.
Figure 2:
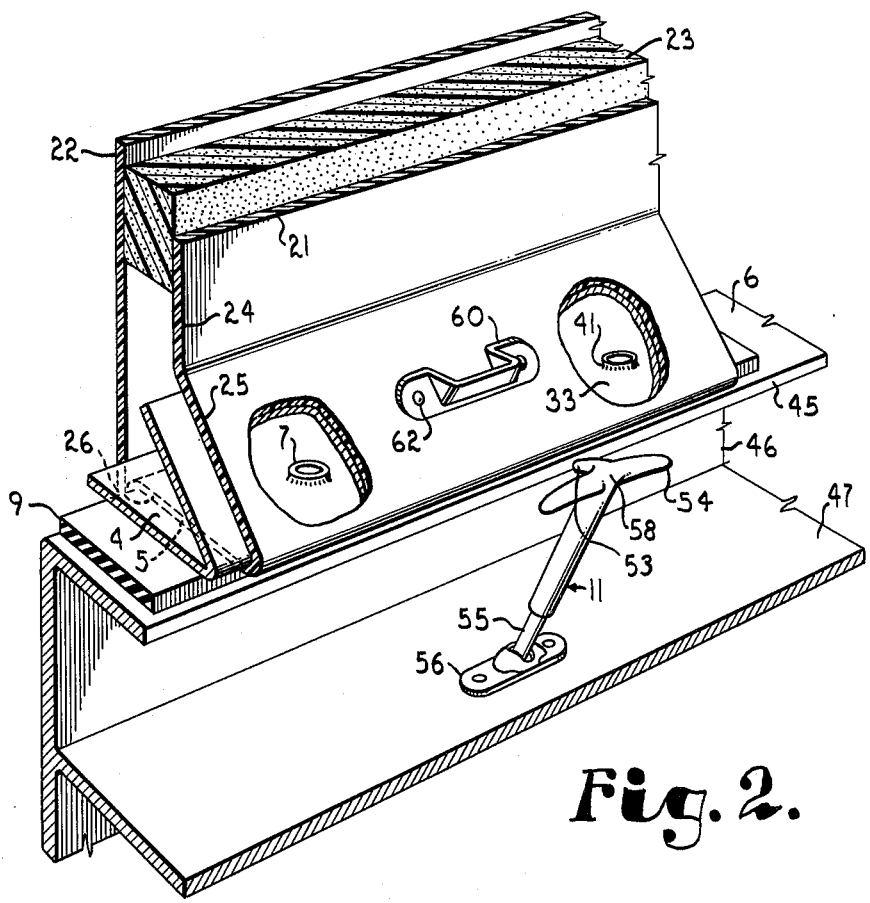
FIG. 2 is a fragmentary, enlarged perspective view of the mounting arrangement.
Figure 3:
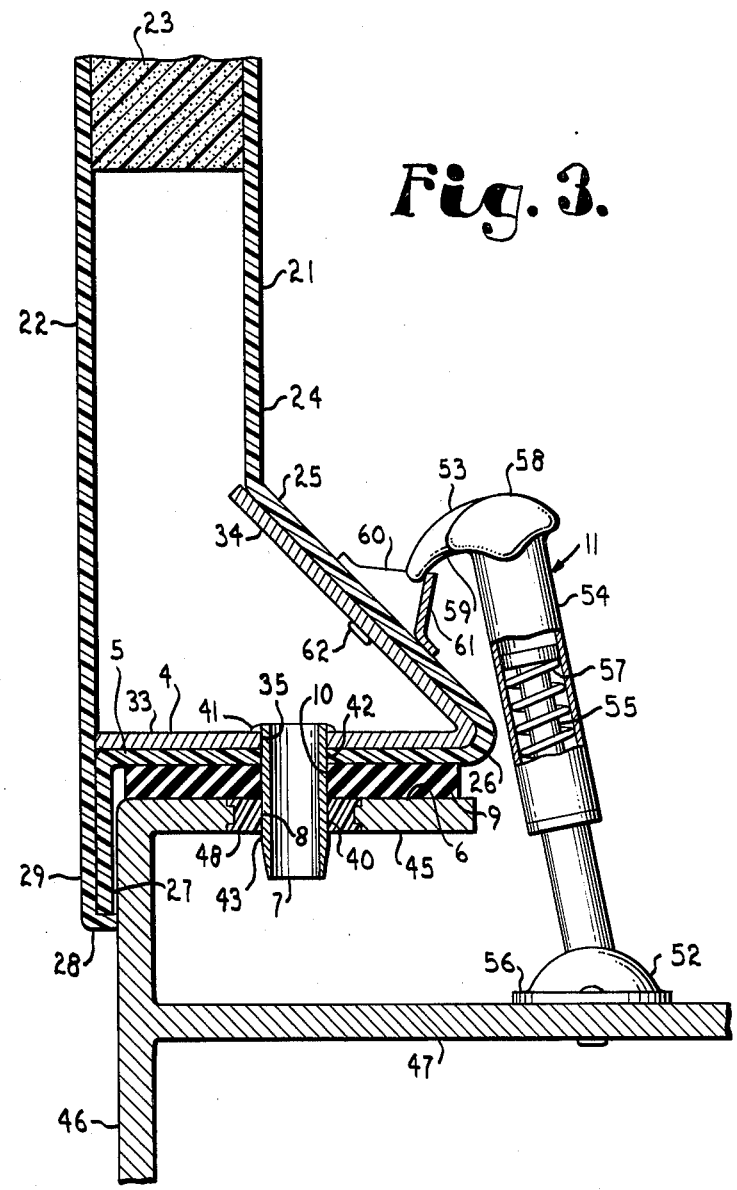
FIG. 3 is a vertical cross-sectional view of the mounting arrangement taken through the side of the cab enclosure and vehicle body.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a mounting arrangement for nonrigidly connecting a vehicle cab enclosure 2 with a vehicle body 3. The mounting arrangement comprises a rigid, elongate plate 4 fixedly attached to the base 5 of the enclosure and extending around a marginal surface 6 of the vehicle body. A plurality of pins 7 are attached to and depend perpendicularly from the plate 4 in a spaced apart and generally aligned relationship. The pins 7 are telescopically inserted into mating apertures 8 positioned in the vehicle body 3 for sliding cooperating therewith. A flexible and resilient gasket 9 is positioned between the plate 4 and vehicle body marginal surface 6 and receives the pins through mating apertures 10 positioned therein, whereby the gasket resists the transmission of vibratory motion between the cab enclosure 2 and vehicle body 3. A plurality of fasteners 11 are spaced apart along the marginal surface 6 and have one end connected with a side wall portion of the vehicle enclosure and the other end connected with the vehicle body. Each of the fasteners 11 includes a resilient member which urges the ends of the fastener convergingly together, thereby pulling the plate 4 toward the marginal surface 6, and securely, yet yieldingly connecting the cab enclosure 2 with the vehicle body 3.

The illustrated vehicle body 3 includes a freestanding windshield 15 wherein the marginal surface 6 extends curvilinearly around the perimeter of the passenger area. The illustrated cab enclosure comprises interconnected top, side, and rear panels 16, 17, and 18 respectively, having the base 5 thereof adapted to mate and abut with the marginal surface 6. Each of the side panels 17 is provided with a hinged door 19 for accessing the passenger area, and a window 20 positioned rearwardly of the door. In this example, the cab enclosure 2 has a double wall construction with spaced apart interior and exterior side walls 21 and 22 respectively. A separator 23 constructed of a suitable material such as styrofoam, wood or the like, is positioned between the interior and exterior side walls and is attached thereto by means such as bonding for transverse rigidity. The interior side wall 21 includes an upstanding portion 24 disposed substantially parallel with the exterior side wall, an inclined portion 25 extending at an angle from the upstanding portion, a base portion 26 positioned substantially horizontally, and a vertically disposed, depending portion 27. The interior side wall portions are preferably integral and molded from a single sheet of material. The exterior side wall 22 is substantially linear having an inturned end portion 28 disposed perpendicularly thereto and connected with the depending portion 27 of the interior side wall to form an enclosed channel. A lower portion 29 of the exterior side wall is preferably bonded with the depending portion 27 and forms an apron which extends below the marginal surface 6 of the body and seals aganist the side of the vehicle body, protecting the cab-body interface from direct exposure to moisture, wind, and the like. In the illustrated arrangement, it is to be noted that the plate 4, welds 41 and upper pin ends are protected, being disposed wholly within the side walls 21 and 22, base 26 and separator 23 which form the enclosed channel, and are generally inaccessible after the inside and outside walls are bonded together.

The plate or angle member 4 is positioned within the channel, between the interior and exterior side walls, and includes first and second dihedral faces 33 and 34 which abut and mate with the base and inclined portions 26 and 25 respectively of the interior side wall. The first and second faces are preferably integral for improved structural strength. A plurality of apertures 35 are positioned vertically through the first face 33 of the angle member in a spaced apart manner along the longitudinal axis thereof. Further, the apertures are disposed centrally in the first face 33 and are mutually aligned. The angle member is constructed of a rigid, strong, non-brittle material, preferably a metal such as steel, aluminum, or the like.

Each of the pins 7 is connected with the first face 33 of the angle member at an upper end thereof and includes a lower engaging portion 40. In the illustrated structure, the pins extend through the angle member apertures 35 and are connected with the first face 33 thereof by a weld 41. The pins 7 extend downwardly through apertures 42 formed through the base portion 26 of the interior side wall. The illustrated pin 7 has a tapered lower end to facilitate insertion and the engaging portion 40 has a cylindrical shape with a smooth outer surface 40 for non-abrading contact.

The gasket 9 is in the shape of a formed band and is flexible and resilient along its vertical dimension (i.e., thickness). A plurality of spaced apart apertures are disposed transversely through the gasket each having a diameter slightly larger than that of the pin and positioned to receive the same therethrough.

The marginal surface 6 of the vehicle body is provided with spaced apart apertures which receive therethrough the pin 7 and slidingly mate therewith. In the illustrated structure, the marginal surface 6 is positioned on a flange portion 45, of the vehicle body which is in turn connected with the side wall and floor portion 46 and 47 respectively. In this example, an antifriction sleeve 48 is attached to the flange 45 and disposed concentrically within each aperture 8 for non-abrading contact therebetween.

The fasteners 11 each have a lower end 52 thereof connected with the body floor 47 and an upper end 53 connected with the interior side wall 21. The illustrated fastener 11 comprises a hollow handle member 54 and a rod member 55 telescopically mounted therein. The rod member 55 has the lower end thereof pivotally attached to the floor 47 by means of a bracket 56 for rotation in a generally vertical plane to swing the fastener toward and away from the cab enclosure, and the upper end thereof connected with a coil spring 57 which urges the handle and rod members together. The handle member 54 includes upper grasping arms 58 and a projecting hook 59. A bracket 60 is attached to the inclined portion 25 of the interior side wall and includes a catch portion 61 which mates with the hook 59 and connects the fastener to the cab enclosure. The bracket is attached to both the interior side wall 21 and the second face 34 of the angle member 4, by means such as the illustrated pop rivet 62.

In installing the cab enclosure 2, the gasket 9 is first positioned on the marginal surface 6 of the vehicle body such that the apertures 8 and 10 vertically align. Each of the fasteners 11 is pivoted inwardly toward the center of the cab to provide clearance for the cab enclosure base. The cab enclosure 2 is then lowered onto the vehicle body with the pins 7 extending through their associated apertures 8 and the gasket positioned between the base portion 26 of the interior wall and the marginal surface 6 of the vehicle body. The grasping arms 58 of each of the fasteners are sequentially pulled upwardly and pivoted inwardly, whereby the hook portion 59 engages the catch 61 of bracket 60. The resilient force of the coil spring 57 urges the cab enclosure and vehicle body securely, yet yieldingly together. The pins 7 locate the cab enclosure 2 on the vehicle body 3 and resist lateral and longitudinal motion therebetween yet allow restricted vertical motion. The gasket cushions vehicle body jars and resists the transmission of vibratory motion between the body and the cab enclosure.

It is to be understood that while I have illustrated and described certain forms of my invention, it is not to be limited to the specific forms or arrangement of parts herein described and shown.

What I claim and desire to secure by Letters Patent is:

1. A mounting arrangement for non-rigidly connecting a vehicle cab enclosure to a vehicle body, said arrangement comprising:
   (a) a rigid, elongate plate for extending around a marginal surface of said vehicle body;
   (b) means for fixedly attaching said plate with said vehicle enclosure;
   (c) a plurality of pins each being attached to and depending perpendicularly from said plate, and being spaced apart therealong, said pins each having an engaging portion with an outer surface for telescopic insertion into apertures disposed in said vehicle body and slidingly mating therewith;
   (d) an elongate gasket being flexible and resilient and having a plurality of spaced apart apertures disposed transversely therethrough; said gasket apertures receiving said pins and mating therewith; said gasket being positioned between said plate and said vehicle body marginal surface and resisting the transmission of vibratory motion therebetween;
   (e) fastening means longitudinally resilient and having a first end thereof shaped for connection with a side wall portion of said vehicle enclosure, and a second end thereof shaped for connection with said vehicle body; said fastening means urging said plate toward said vehicle body marginal surface and securely and yieldingly connecting the vehicle enclosure with said vehicle body.

2. An arrangement as set forth in claim 1 wherein:
   (a) said engaging portion of each of said pins is smooth for non-abrading contact with said vehicle body.

3. An arrangement as set forth in claim 2 wherein:
   (a) said engaging portion of each of said pins has a cylindrical shape; and including
   (b) a plurality of antifriction sleeves for positioning in each of said vehicle body apertures; said sleeves slidingly receiving said pins therein for non-abrading contact therebetween.

4. An arrangement as set forth in claim 2 wherein said fastening means comprises:
   (a) a latch arm with telescoping handle and rod members; said rod having a lower end thereof pivotally mounted in said vehicle body for rotation in a generally vertical plane, toward and away from said cab enclosure; said handle having a protruding hook portion separably engaging said vehicle enclosure; and
   (b) a coil spring resiliently urging said handle and rod members together.

5. In combination, a vehicle enclosure and a mounting arrangement therefor, said combination comprising:
   (a) a vehicle enclosure body having a base portion thereof adapted for connection with and being supported by a marginal surface of a vehicle body; said base having first and second spaced apart upstanding side walls and a bottom connected therewith and extending therebetween;
   (b) an angle member having first and second dihedral faces and being positioned between said side walls and within said base; said angle member having the first and second faces thereof abutting and mating with said bottom and one of said side walls respectively;
   (c) a plurality of pins each being attached to and depending perpendicularly from said first face and being spaced apart therealong; said pins each having an engaging portion for telescopic insertion into apertures disposed through the marginal surface of said vehicle body and slidingly mating therewith;
   an elongate, resilient gasket having a plurality of spaced apart apertures disposed transversely therethrough; said gasket apertures receiving therein said pins; said gasket being positioned between said bottom and the marginal surface of said vehicle body and resisting the transmission of vibratory motion therebetween;
   (e) fastening means being longitudinally resilient and having a first end thereof connected with said one side wall and said angle member second surface, and having a second end thereof for connection with said vehicle body; said fastening means urging said base toward said vehicle body marginal surface and securely connecting the vehicle enclosure with said vehicle body.

6. An arrangement as set forth in claim 5 wherein:
   (a) said engaging portion of each of said pins has a smooth outer surface and a cylindrical shape; and including
   (b) a plurality of antifriction sleeves for positioning in each of said vehicle body apertures; said sleeves slidingly receiving said pins therein for non-abrading contact therebetween.

7. An arrangement as set forth in claim 5 wherein:
   (a) said base is a molded synthetic resin material; and
   (b) said angle member and pins are constructed of metal.

8. An arrangement as set forth in claim 5 wherein:
   (a) said first and second side walls constitute interior and exterior side walls respectively;
   (b) said angle member second surface abuts said interior side wall; and
   (c) said fastening means first end is connected with said interior side wall and said angle member second surface.

9. An arrangement as set forth in claim 8 wherein:
   (a) said interior side all intersects said bottom at an acute angle and includes an inclined portion; and
   (b) said fastening means first end has separable connection with the inclined portion of said interior side wall.

10. An arrangement as set forth in claim 9 wherein:
    (a) said interior side wall and said bottom and intergral and one pieces; and
    (b) said interior side wall includes an end portion thereof bonded to an associated end portion of said exterior side wall, thereby forming an apron which extends below said marginal surface and forms a seal therefor.

* * * * *